(12) United States Patent
Estival et al.

(10) Patent No.: US 10,931,163 B2
(45) Date of Patent: Feb. 23, 2021

(54) ELECTROMECHANICAL ACTUATOR WITH STATOR TEETH DIMENSIONED TO OPERATE A SATURATION BEND FOR ELECTRICAL FLIGHT CONTROLS OF AN AIRCRAFT

(71) Applicant: AIRBUS HELICOPTERS, Marignane (FR)

(72) Inventors: Pierre Estival, Noueilles (FR); Boris Grohmann, Munich (DE); Thibaut Marger, Gignac-la-Nerthe (FR)

(73) Assignee: AIRBUS HELICOPTERS, Marignane (FR)

( * ) Notice: Subject to any disclaimer, the term of this patent is extended or adjusted under 35 U.S.C. 154(b) by 168 days.

(21) Appl. No.: 15/767,753

(22) PCT Filed: Sep. 20, 2016

(86) PCT No.: PCT/EP2016/072239
§ 371 (c)(1),
(2) Date: Apr. 12, 2018

(87) PCT Pub. No.: WO2017/063823
PCT Pub. Date: Apr. 20, 2017

(65) Prior Publication Data
US 2018/0301955 A1 Oct. 18, 2018

(30) Foreign Application Priority Data
Oct. 16, 2015 (FR) ........................................ 1502179

(51) Int. Cl.
*H02K 7/00* (2006.01)
*H02K 7/14* (2006.01)
(Continued)

(52) U.S. Cl.
CPC ............ *H02K 7/003* (2013.01); *B64C 13/503* (2013.01); *H02K 1/146* (2013.01); *H02K 1/148* (2013.01);
(Continued)

(58) Field of Classification Search
CPC .......... H02K 7/003; H02K 7/14; H02K 1/146; H02K 1/148; H02K 1/2706; H02K 1/2753;
(Continued)

(56) References Cited

U.S. PATENT DOCUMENTS

| 4,434,389 A | 2/1984 | Langley et al. |
| 5,721,461 A * | 2/1998 | Taylor .................... H02K 7/025 310/113 |

(Continued)

FOREIGN PATENT DOCUMENTS

| DE | 102013112525 A1 | 5/2015 |
| EP | 2378634 A1 | 10/2011 |

(Continued)

OTHER PUBLICATIONS

Design of Brushless Permanent Magnet Motors by J.R.Hendershot et al. published 1994, ISBN: 978-0-19-859389 pp. 4-2 to 4-3.*

(Continued)

*Primary Examiner* — Maged M Almawri
(74) *Attorney, Agent, or Firm* — Brooks Kushman P.C.

(57) ABSTRACT

An electromechanical actuator for electrical flight controls of an aircraft, the actuator comprising a transmission shaft, four electromechanical conversion members, each having a respective stator and rotor secured to the transmission shaft, and four control systems, each dedicated to respective ones of the electromechanical conversion members. The stator has teeth and windings surrounding at least one tooth, whereas the rotor is provided with permanent magnets. Each (Continued)

electromechanical conversion member is a flux-concentrating member and each winding is concentric and has a single layer. The electromechanical actuator is intended in particularly for controlling a hydraulic actuator via a mechanical transmission within an electrical flight control device of an aircraft.

19 Claims, 2 Drawing Sheets

(51) Int. Cl.
    *H02K 16/04*    (2006.01)
    *H02K 11/33*    (2016.01)
    *H02K 1/14*     (2006.01)
    *H02K 1/27*     (2006.01)
    *B64C 13/50*    (2006.01)

(52) U.S. Cl.
    CPC ......... *H02K 1/2706* (2013.01); *H02K 1/2773* (2013.01); *H02K 7/14* (2013.01); *H02K 11/33* (2016.01); *H02K 16/04* (2013.01); *H02K 2213/03* (2013.01); *H02K 2213/06* (2013.01)

(58) Field of Classification Search
    CPC ...... H02K 1/278; H02K 1/2773; H02K 16/00; H02K 16/04; H02K 2213/03; H02K 2213/06; B64C 13/503
    USPC ...... 310/75 R, 49.29, 49.31, 49.51, 216.001, 310/216.004, 216.097, 216.111
    See application file for complete search history.

(56) References Cited

U.S. PATENT DOCUMENTS

| | | | | |
|---|---|---|---|---|
| 5,982,074 | A * | 11/1999 | Smith | H02K 3/04 310/156.36 |
| 6,208,497 | B1 * | 3/2001 | Seale | F01L 9/04 361/154 |
| 8,622,864 | B2 * | 1/2014 | Fauteux | B25J 9/102 475/91 |
| 9,180,770 | B1 * | 11/2015 | Lugg | B60K 3/04 |
| 9,780,704 | B2 * | 10/2017 | Pietromonaco | H02P 25/092 |
| 2001/0043450 | A1 * | 11/2001 | Seale | F01L 9/04 361/160 |
| 2005/0052080 | A1 * | 3/2005 | Maslov | B60L 8/00 307/10.1 |
| 2006/0033392 | A1 * | 2/2006 | Ritchey | H02K 7/108 310/112 |
| 2008/0088200 | A1 * | 4/2008 | Ritchey | H02K 16/00 310/268 |
| 2008/0156939 | A1 * | 7/2008 | Hanlon | B64C 13/507 244/223 |
| 2009/0072083 | A1 * | 3/2009 | Hanlon | H02K 16/00 244/87 |
| 2009/0102413 | A1 * | 4/2009 | Hanlon | B64C 27/08 318/738 |
| 2010/0148611 | A1 * | 6/2010 | Wang | H02K 1/14 310/156.37 |
| 2011/0045932 | A1 * | 2/2011 | Fauteux | B25J 9/102 475/221 |
| 2011/0290581 | A1 * | 12/2011 | Neubauer | B62D 5/0403 180/444 |
| 2012/0306302 | A1 * | 12/2012 | Ritchey | H02K 7/108 310/78 |
| 2013/0168501 | A1 * | 7/2013 | Chaduc | B64C 27/64 244/227 |
| 2014/0191606 | A1 * | 7/2014 | Gieras | H02K 19/22 310/112 |
| 2015/0054380 | A1 | 2/2015 | Suzuki | |
| 2015/0084446 | A1 * | 3/2015 | Atar | H02K 16/00 310/43 |
| 2016/0079893 | A1 * | 3/2016 | Pietromonaco | H02K 19/103 318/254.1 |
| 2016/0226349 | A1 * | 8/2016 | Mastrocola | H02K 11/21 |
| 2017/0274992 | A1 * | 9/2017 | Chretien | B64C 27/14 |

FOREIGN PATENT DOCUMENTS

| | | |
|---|---|---|
| EP | 2543589 A1 | 1/2013 |
| FR | 1149195 A | 12/1957 |
| FR | 2493059 A1 | 4/1982 |
| GB | 864899 | 4/1961 |
| WO | 2009082808 A1 | 7/2009 |
| WO | 2014056773 A2 | 4/2014 |

OTHER PUBLICATIONS

DE_102013112525A1_English_Translation.*
J.R. Hendershot et al., "Design of Brushless Permanent-Magnet Motors" in "Design of Brushless Permanent-Magnet Motors", Jan. 1, 1994, Oxford University Press, United Kingdom, XP055406211, ISBN: 978-0-19-859389-8, pp. 4-2-4-3.
International Preliminary Report for PCT/EP2016/072239, Completed by the European Patent Office, dated Jan. 24, 2018, All together 9 Pages.
Written Opinion and International Search Report for PCT/EP2016/072239, Completed by the European Patent Office, dated Nov. 23, 2016, All together 14 Pages.

* cited by examiner

ELECTROMECHANICAL ACTUATOR WITH STATOR TEETH DIMENSIONED TO OPERATE A SATURATION BEND FOR ELECTRICAL FLIGHT CONTROLS OF AN AIRCRAFT

CROSS-REFERENCE TO RELATED APPLICATIONS

This application is the U.S. National Phase of PCT Application No. PCT/EP2016/072239 filed Sep. 20, 2016, which claims priority to French Application No. FR 1502179 filed Oct. 16, 2015, the disclosures of which are incorporated in their entirety by reference.

BACKGROUND OF THE INVENTION

(1) Field of the Invention

The present invention relates to the field of electromechanical actuators. It relates to an electromechanical actuator that is intended more particularly for use in electrical flight controls of aircraft. The present invention also relates to an electrical flight control device including such an electromechanical actuator controlling a hydraulic actuator.

(2) Description of Related Art

An electromechanical actuator transforms electrical energy into mechanical energy. Electromechanical actuators are complex systems combining various functions in order to perform this transformation. An electromechanical actuator is made up of an electromechanical conversion member, means for processing control orders, electronic power means, electronic control and monitoring means, sensors in order to control correctly the electromechanical conversion member, and an electrical power supply conditioning stage.

The mechanical energy is generally delivered by an angular movement of a shaft, and it is characterized by a speed of rotation and by a torque. More particularly, that constitutes a rotary electromechanical conversion member. The shaft may have an angular stroke limited to a few tens of degrees. The shaft may also have an angular stroke that is unlimited so as to be capable of performing a plurality of complete rotations. The electromechanical conversion member is then generally referred to as an "electric motor". Under such circumstances, the electromechanical actuator may include a mechanical transformation stage for transforming the rotary movement of the electromechanical conversion member into movement in translation.

Nevertheless, this mechanical energy can equally well be delivered by a linear movement of a shaft, being characterized by a speed in translation and by a force, in which case it is more specifically a linear electromechanical conversion member that may also be referred to as an "electric slider". The linear stroke of the shaft is limited by the dimensions of the linear electromechanical actuator.

The electrical energy powering an electromechanical actuator, and more precisely its electrical power supply conditioning stage, may be delivered by direct current (DC) or by single phase or polyphase alternating current (AC), such as three-phase AC. In addition, three-phase AC can be obtained from a DC source that is subjected to switching or "chopping" by electronic power means controlled by electronic return means so as to create an AC voltage, and consequently alternating current. The voltages powering the electric motor are phase shifted relative to one another by 120° in order to create a three-phase power supply.

A rotary electromechanical conversion member has at least one generally stationary stator, at least one rotor that can rotate relative to the stator and that may be located inside or outside the stator, and also an airgap between a stator and a rotor. Rotation of the rotor is generated by interaction between two magnetic fields that are attached respectively to the stator and to the rotor, thereby creating magnetic torque on the rotor. Reference may then be made to a "stator magnetic field" and to a "rotor magnetic field".

The airgap is formed by a volume of air through which magnetic flux passes between the rotor and the stator. The length of the airgap is a characteristic having an influence on the performance of the electromechanical conversion member. Specifically, it is known that the drive torque of an electromechanical conversion member is increased by reducing the distance between the rotor and the stator, which distance corresponds to the length of its airgap.

Nevertheless, Document FR 1 149 195 is known, which describes improvements to electric motors used mainly in clockmaking. One of the improvements is to increase the airgap between the rotor and the stator thus making it possible, contrary to accepted practice at that time, to increase magnetic power even though magnetic fluxes are reduced. That also makes it possible to reduce opposing fluxes due to variations in the reluctance of the magnetic circuits. Furthermore, increasing the airgap makes fabrication easier.

The electromechanical actuator of the invention is intended particularly for use in electrical flight controls of an aircraft. In this particular application, sometimes referred to as "fly-by-wire", an angular movement of the shaft of an electromechanical actuator is generally transformed into movement in translation by a mechanical transmission in order to control a hydraulic actuator. Consequently, the shaft of the mechanical actuator has no need to turn through several revolutions about its axis of rotation, so its angular movement stroke can therefore be limited. As a result, for simplification purposes in the description below, the term "electromechanical actuator" is used more simply to designate such a rotary electromechanical actuator. Likewise, the term "electromechanical conversion member" is used to designate such a rotary electromechanical conversion member.

Document EP 2 543 589 describes primary flight controls for a main rotor and for a tail rotor of a rotary wing aircraft with an electromechanical interface between the electrical controls and the hydraulic servo-control actuators in order to control the amplification force controlling the main rotor and/or the tail rotor. The electromechanical interface has an electric motor and a mechanical linkage enabling the electric motor to control a hydraulic servo-control and consequently to control the hydraulic servo-control actuators for each control axis of the main rotor and of the tail rotor. That system is applicable to existing aircraft for replacing the electromechanical devices they use. Furthermore, by a mechanical linkage without any speed reduction member between the electric motor and the hydraulic servo-control, the electric motor can be shifted and off-axis, thus making it easier to integrate in the aircraft. The speed reduction members that are conventionally used comprise for example reduction gearing and an epicyclic gear train.

Electromechanical conversion members in most widespread use include brushless DC (BLDC) motors.

A brushless motor has one or more permanent magnets and its stator has non-permanent magnets, usually referred to as electromagnets. The electromagnets are generally constituted by one or more coils of electrical conductors wound around a ferromagnetic material and powered with DC. The term "winding" is used below to designate a set of one or more such electrical conductor coils. A brushless motor generally has a sensor making it possible to know the position of the rotor, together with an electronic control system that switches the AC powering the stator windings. Thus, the electronic control system serves to determine the angle and the direction of the stator magnetic field relative to the rotor magnetic field, and consequently serves to cause the rotor to turn relative to the stator.

Furthermore, within each stator winding, one or more coils may be grouped together in order to form different phases of the stator. Each stator phase is powered by one of the phases of polyphase AC and generates a respective stator magnetic field. When the stator magnetic fields come from the same polyphase AC, they add to form a single rotating stator magnetic field, referred to as the stator resultant. This stator resultant then entrains rotation of the rotor field, and consequently creates movement in rotation and torque of the rotor relative to the stator.

AC electromechanical actuators include synchronous machines and asynchronous machines.

Synchronous machines, which include brushless motors, make use of an offset of ninety degrees (90°) magnetic between the rotary field and the stationary field. In this way, the position of the rotor is always accurately determined. Furthermore, the rotation frequency of the rotor of a synchronous machine is proportional to the frequency of the AC powering the stator.

Asynchronous machines have a rotor with a winding in which the coils are short-circuited and a stator having a winding constituting non-permanent magnets. As a result, when the winding of the stator conveys AC, it creates a rotating stator magnetic field with the stator resultant giving rise to the appearance of magnetic flux variation. An induced electromotive force (emf) appears and creates rotor currents in the rotor winding. These currents give rise to torque appearing. An offset between the stator field that is rotating relative to the stator and the rotor field that is stationary relative to the rotary shaft of the rotor then appears. The drawback of an asynchronous machine is the position offset, also referred to as "slip", that is created between the stator field and the rotor field. The accuracy with which the rotor shaft is positioned is thus subject to the opposing torque applied to the shaft of the machine. In addition, the frequency of rotation of the rotor of an asynchronous machine is not necessarily proportional to the frequency of the AC, it being possible for a slip speed to appear between the rotor and the stator magnetic field. That type of asynchronous machine is generally used for applications at constant speed and quasi-constant torque.

Furthermore, synchronous permanent magnet brushless electric motors may be classified in two major categories: trapezoidal flux motors and sinusoidal flux motors.

A trapezoidal flux motor possesses an emf of trapezoidal type when it is used as an electricity generator. This trapezoidal waveform of the emf is obtained by using a rotor having smooth poles, with the length of the airgap being constant. Since this airgap length does not vary, the airgap induction remains constant along a pole and reverses when the magnetic pole changes. The slope of the trapezoid is due to the distance between two magnetic poles.

A sinusoidal flux motor possesses emf of sinusoidal type when it is used as an electricity generator. This sinusoidal waveform is obtained by installing a rotor having projecting magnetic poles of shape approximating a sinusoidal function. The length of the airgap is then variable and a major actor for the airgap induction that induces the waveform of the emf. Thus, in order to create maximum torque when operating as a motor, the electricity used presents sinusoidal waveforms. Furthermore, such a sinusoidal flux motor generally possesses low cogging torque.

Also known is Document WO 2014/056773, which describes an electromechanical actuator having a rotor with poles formed by permanent magnets. The poles of the rotor include at least four zones having different magnetic properties arranged symmetrically relative to a center of the pole. The surfaces of the permanent magnets can be configured so that the edge of a pole is lower than the middle of that pole. Consequently, magnetic flux appears that is of substantially sinusoidal distribution in the electromechanical actuator.

Likewise, Document EP 2 378 634 describes an electromechanical actuator, such as an electricity generator, having permanent magnets of section that is sinusoidally shaped in a plane perpendicular to the axis of rotation of the electromechanical actuator. Consequently, the sinusoidal shape of the permanent magnet serves to create sinusoidal airgap induction and causes a substantially sinusoidal magnetic flux distribution to appear.

In addition, several winding architectures are possible for synchronous brushless motors.

Firstly, the winding may be distributed or else concentric. With a concentric winding, each wound tooth of the stator is surrounded by an electrical conductor carrying a single phase of the AC powering the motor. With a distributed winding, each wound tooth of the stator is surrounded by at least two electrical conductors carrying at least two phases of the AC. A concentric winding presents safety advantages by avoiding overheating of a conductor of one phase spreading to other phases. In contrast, a distributed winding makes it possible to create a specific stator magnetic field as a function of the number of turns per slot, and consequently creates a sinusoidal total stator field.

Furthermore, concentric windings may be single-layer windings or double-layer windings. A single-layer winding makes use of only half of the teeth of the stator, with a winding surrounding one tooth while the adjacent teeth are left free, i.e. without any winding. This is unlike a double-layer winding, which makes use of all of the teeth, each of which is wound. A single-layer winding makes it possible to have slots of small section for a large number of conductors. A single-layer winding also makes it possible for windings to be spaced apart from one another, thereby limiting their interactions. In contrast, double-layer windings have half the number of turns per tooth in order to create the same torque as a single-layer winding. Each tooth is thus easier to wind at lower cost. However, double-layer windings give rise to a mutual induction effect between the various phases of the machine and they run the risk of a fault on one tooth propagating to an adjacent tooth.

Finally, it is known that the ferromagnetic materials used in electromechanical conversion members present three distinct characteristics in their use as carriers of magnetic flux. These three characteristics are defined by a curve plotting variation in the magnetic induction of the material as a function of its coercive magnetic field. The curve is made up of a linear first portion characterized by the magnetic permeability of the ferromagnetic material, a rounded second portion constituting a saturation bend, and a linear third portion characterized by the magnetic permeability of air.

In the great majority of situations, a ferromagnetic material is used in the linear first portion of its curve so as to avoid any saturation of the material. Specifically, when the material becomes magnetically saturated, the magnetic flux reaches a maximum value and can no longer increase, so the torque delivered by the electromechanical conversion member cannot increase either.

Nevertheless, Document US 2015/0054380 describes an electromechanical actuator serving in particular for a hybrid vehicle or an electric vehicle. The electromechanical actuator has slots or holes between the teeth of its stator and/or in the proximity of each magnetic pole of its rotor. Saturation of the magnetic flux flowing in that electromechanical actuator then appears in those slots, serving to reduce undulations in the torque delivered by that electromechanical actuator.

Also known are Documents DE 10 2013 112525 and US 2005/0052080, which describe electromechanical actuators having a plurality of electromechanical conversion members for powering a vehicle.

In particular, according to Document DE 10 2013 112525, an electromechanical actuator has two electromechanical conversion members powered by two control systems. Each electromechanical conversion member is constituted by a stator co-operating with a common rotor.

Furthermore, in Document US 2005/0052080, an electromechanical actuator has a plurality of electromechanical conversion members that are mutually isolated in order to eliminate electrical and electromechanical interference. For example, an electromechanical actuator may have five electromechanical conversion members.

Furthermore, Document WO 2009/082808 describes a distributed segmented electromechanical actuator, such as a motor-generator, having firstly a plurality of pairs of segments forming a stator, each segment being provided with a winding, and secondly a plurality of segments provided with at least one permanent magnet and forming a rotor. The pair of segments of the stator may be connected together to form a segment group thus constituting an electromechanical conversion member.

Finally, Document US 2011/0290581 describes an electromechanical actuator having a stator with twelve teeth and a rotor provided with ten poles that are separated from one another by spaces. The poles are sinusoidal in shape.

In the context of an application to flight controls, electromechanical actuators are subjected to various operating constraints. A first constraint is ensuring safe operation of flight controls in the event of a failure on an electromechanical actuator, and a second constraint is one of small volume and weight in order to be suitable for integrating in an aircraft. In order to satisfy the safety first constraint, equipment redundancy is being implemented nowadays. The core of an electromechanical actuator, for its power portion, lies in the rotor-stator torque. Nevertheless, providing redundancy for this rotor-stator torque gives rise to extra size and to a weight penalty that goes against the second constraint.

Redundancy is also possible for the windings of the stator, as described in Document FR 2 493 059. That electric motor has a rotor with permanent magnets, a stator with redundant windings, and four magnetic poles. Since the windings are redundant, the motor can operate in spite of one winding failing. That motor can be used equally well in toys and for moving flight controls of an aircraft.

BRIEF SUMMARY OF THE INVENTION

An object of the present invention is thus to propose an electromechanical actuator that makes it possible to overcome the above-mentioned limitations so as to guarantee safe operation, while optimizing its weight and its size.

According to the invention, an electromechanical actuator comprises a transmission shaft having an axis of rotation, at least one electromechanical conversion member provided with a stator and a rotor secured to the transmission shaft and rotatable about said axis of rotation, and at least one control system. The stator is provided with teeth and windings, each winding surrounding at least one tooth, while the rotor is provided with permanent magnets, each having a north magnetic pole and a south magnetic pole.

The rotor preferably rotates inside the stator so as to limit the overall size of each electromechanical conversion member, and consequently of the electromechanical actuator. Nevertheless, the rotor could be situated outside the stator.

Each control system has all of the elements needed for powering and for controlling an electromechanical conversion member.

By way of example, each control system comprises means for processing control orders, an electronic power device, an electronic control and monitoring device, sensors, and an electrical power supply conditioning stage.

The electromechanical actuator of the invention is intended more particularly for electrical flight control devices of aircraft, and in particular of rotary wing aircraft.

The electromechanical actuator of the invention is remarkable in that it has three electromechanical conversion members and at least three control systems, each control system being connected to a single respective electromechanical conversion member and powering the conversion member with AC.

Each control system thus powers a single conversion member with AC, which may be monophase or else polyphase.

The electromechanical actuator of the invention thus provides redundancy both in terms of electromechanical conversion members and also in terms of control systems, each control system being dedicated to a single electromechanical conversion member.

The redundancy aspect is essential for ensuring continuing operation of the electromechanical conversion members in the event of one or more of the electromechanical conversion members failing. Thus, in the event of a failure affecting one conversion member or indeed one control system, the actuator can still operate using the other electromechanical conversion members and the other control systems that are not impacted by the failure, and that thus remain operational.

In addition, in order to reduce the overall size and weight of the electromechanical actuator of the invention, at least two electromechanical conversion members may include a rotor in common. The common rotor thus co-operates with the stators of these at least two electromechanical conversion members.

By way of example, two electromechanical conversion members powered by three-phase AC have a rotor in common and their respective stators, each of which has three phases, co-operate with the common rotor. Thus, two stators are assembled with the common rotor so as to form a six-phase architecture.

In addition, the stators co-operating with a common rotor can be magnetically isolated by non-magnetic radial separation. Putting such a strongly non-magnetic zone in place within the stator yokes of the stators thus provides significant magnetic decoupling between the stators, thereby avoiding any mutual disturbance among them. This non-magnetic radial separation may be located between two teeth of the stators in the form of a piece of the stator yokes, the stator yokes supporting in particular the teeth of the two stators. Such non-magnetic radial separation leads to a reduction in the performance of the electromechanical conversion members that is not significant.

Furthermore, in order to optimize the overall size and the weight of the electromechanical actuator of the invention, each electromechanical conversion member preferably includes a rotor with flux-concentrating permanent magnets. The permanent magnets are arranged in such a manner as to provide flux concentration in the airgap, thereby maximizing the torque of the electromechanical conversion member. Consequently, for a predetermined torque that is to be delivered by the electromechanical conversion member, the use of flux-concentrating permanent magnets makes it possible to optimize the dimensions of the electromechanical conversion member, and consequently to optimize its overall size and weight. The use of flux-concentrating permanent magnets may also make it possible to use permanent magnets that are of lower performance, and consequently that are less expensive.

Furthermore, in order to limit the risks of failures in the electromechanical actuator of the invention, each electromechanical conversion member preferably makes use of single-layer concentric windings. As a result, interactions between the windings are limited. Consequently, an incident on one of the windings, such as a conductor overheating, does not propagate to the other windings, thereby limiting the effects of the incident.

Another cause of failures is jamming of an electromechanical conversion member, e.g. as a result of a foreign body appearing between the rotor and the stator. The use of an airgap that is large, compared with the airgap that is normally used in equivalent electrical machines, enables this risk of jamming to be inhibited, thus guaranteeing continuity of operation of the electromechanical conversion member. The airgap of an electromechanical conversion member is preferably greater than 1 millimeter (mm). For example, the airgap may lie in the range 1 mm to 2 mm.

Advantageously, the use of a large airgap also makes it possible to reduce interfering torques, such as a cogging torque or a reluctance torque, which could give rise to disturbances in the torque developed by the electromechanical conversion member. In addition, the use of a large airgap makes it possible to slacken fabricating tolerances on the components of the rotor and the stator, thereby leading to a drop in the cost of fabricating those components.

In addition, the magnets poles of each electromechanical conversion member may be fractioned or else they may be integral. The use of fractional magnetic poles enables the cogging torque present in the electromechanical conversion member to be reduced, but at the cost of creating disturbances, in particular in the power supply current. The use of integral magnetic poles serves on the contrary to reduce the appearance of such disturbances.

An electromechanical conversion member has fractional poles when the ratio $$\frac{N_d \cdot N_{ph}}{N_p}$$

is not an integer, where $N_p$ is a first total number giving the number of pairs of magnetic poles, $N_d$ is a second total number giving the number of teeth, and $N_{ph}$ is the number of phases of the AC powering the electromechanical conversion member.

In contrast, an electromechanical conversion member has integral magnetic poles when the ratio $$\frac{N_d \cdot N_{ph}}{N_p}$$

is equal to an integer.

It is possible to refer to fractional winding machines for electromechanical conversion members having fractional magnetic poles, and integral winding machines for electromechanical conversion members having integral magnetic poles.

Furthermore, the magnetic poles of the rotor may project and present a shape that is sinusoidal so that sinusoidal magnetic flux flows in each electromechanical conversion member.

In the specific circumstance of a short-circuit type failure in a winding, a large opposing torque referred to as a "short-circuit torque" appears in the electromechanical conversion member that has suffered this fault, and continues until the power supply to the electromechanical conversion member is interrupted. This short-circuit torque thus prevents the rotor of that electromechanical conversion member from rotating. Declutching devices can be used to separate the failed electromechanical conversion member from the other electromechanical conversion members of the electromechanical actuator so as to avoid the electromechanical actuator as a whole being blocked, and consequently so as to avoid losing a function.

However, the use of such declutching devices within an electromechanical actuator then increases the overall size and weight of the electromechanical actuator.

In order to avoid using declutching devices within an electromechanical actuator of the invention, the teeth of each stator are dimensioned in such a manner that each electromechanical conversion member operates close to its saturation zone. In particular, each electromechanical conversion member preferably operates at the saturation bend in the curve plotting variation of magnetic induction in the ferromagnetic material constituting the teeth.

Specifically, an electromechanical conversion member generally operates far from its saturation zone. Thus, the magnetic flux flowing in each tooth of the stator and in the magnetic poles of the rotor can increase, thereby enabling the torque that is delivered by that electromechanical conversion member to be increased. However, in the event of a short circuit in a winding of that electromechanical conversion member, the short-circuit torque resulting from that short circuit is much greater than the nominal torque of the electromechanical conversion member.

In contrast, for each electromechanical conversion member of the electromechanical actuator of the invention operating close to its saturation zone, the nominal torque that is delivered cannot increase very much, with the magnetic flux rapidly flowing at its maximum as soon as saturation occurs in the rotor and/or the stator. Consequently, the short-circuit torque of an electromechanical conversion member suffering a short-circuit type failure is then only a little greater than the nominal torque of that electromechanical conversion member. By way of example, the short-circuit torque of an electromechanical conversion member may be 125% of its nominal torque.

Advantageously, two electromechanical conversion members then serve to mitigate a short-circuit type failure of one electromechanical conversion member, with one of the two electromechanical conversion members compensating the majority or indeed all of the short-circuit torque coming from the failed electromechanical conversion member, while the other member delivers the nominal torque needed to operate the electromechanical actuator.

Such operation of each electromechanical conversion member thus makes it possible to maximize use of the induction of the ferromagnetic material constituting the teeth and the stator yoke and/or of the ferromagnetic material constituting the magnetic poles of the rotor. These ferromagnetic materials are then used over the entire linear first portion and in the saturation bend of their curve plotting variation in magnetic induction. A maximum value of the induction, situated in the saturation bend, is determined so as to avoid reaching total saturation of the ferromagnetic material.

The dimensioning of each electromechanical conversion member can be determined from the values desired for induction in key locations of the stator, in the teeth and in the stator yoke, or indeed in the rotor, with these desired induction values being as close as possible to the saturation bend of the curve plotting magnetic induction variation.

Thus, the dimensions of the stator can be defined so that saturation appears in the stator. For this purpose, the dimensions of the stator are smaller than in an electromechanical conversion member that operates conventionally, thereby advantageously reducing the overall size and the weight of each electromechanical conversion member.

Likewise, the dimensions of the rotor can also be defined so that saturation appears in the rotor, mainly for a flux-concentrating rotor, or indeed for a buried-magnet rotor.

Consequently, the major dimensions for the stator are the dimensions of the teeth or indeed the dimensions of the stator yoke so that saturation appears respectively in the teeth or else in the stator yoke. The major dimensions of the rotor for optimizing are the dimensions of the magnetic poles or else the dimensions of the armature of the rotor so that saturation appears respectively in the magnetic poles or else in the armature of the rotor.

For example, when the stator yoke is made of a stack of laminations, the width $l_d$ of the teeth and the height $h_{cs}$ of the stator yoke are defined by the following formulas:

$$l_d = \frac{B_g \cdot T_d}{B_{max} \cdot K_{fe}} \text{ and } h_{cs} = \frac{\Phi_g}{B_{max} \cdot L_{st} \cdot K_{st}}$$

where $T_d$ is the axial length of a tooth expressed in meters (m), $B_g$ is the induction of the airgap in nominal operation expressed in teslas (T), $K_{fe}$ is a swelling coefficient, $B_{max}$ is the maximum value of the airgap induction expressed in teslas (T), $\Phi_g$ is the airgap flux at a rotor pole in nominal operation expressed in webers (Wb), $L_{st}$ is the axial length of the electromechanical conversion member expressed in meters, and $K_{st}$ is a stacking factor.

The swelling coefficient is a coefficient taking account of the space between the laminations with which the stator is fabricated and accommodates uncertainly about the complete length of the electromechanical conversion member resulting from fabrication accuracy. The stacking factor serves to take account of variation in the area of the set of laminations for calculating magnetic fluxes.

By way of example, when the ferromagnetic material used for fabricating the stator yoke and the teeth is an iron-silicon alloy, the maximum value $B_{max}$ of said induction is equal to 2.1 T. Thus, in a preferred embodiment of the invention, the width $l_d$ of the teeth is equal to 4.4 mm and their height $h_{cs}$ is equal to 4 mm for an axial length $T_d$ of a tooth of 8.8 mm, airgap induction $B_g$ of 1.09 T, a swelling coefficient $K_{fe}$ of 1.04, an airgap flux $\Phi_g$ of 0.000248 Wb, and an axial length $L_{st}$ of the electromechanical conversion member of 33 mm, with a stacking factor $K_{st}$ of 0.9.

It is also possible to determine the first total number $N_p$ of pairs of magnetic poles of the rotor and the second total number $N_d$ of teeth of the stator that make it possible firstly to satisfy the constraints for fabricating such an electromechanical conversion member and secondly to optimize the operation of the electromechanical conversion member.

This calculation is performed for a preferred embodiment of an electromechanical actuator of the invention in which each electromechanical conversion member is a three-phase synchronous brushless motor having permanent magnets and flux concentration, with a fractional pole, single-layer concentric windings, and periodicity of second order.

This preferred embodiment relies on the following assumptions.

Firstly, each winding is a single-layer winding. Specifically, since every other tooth is not wound, each electromechanical conversion member has at least two teeth per phase of the AC power supply or some number of teeth proportional to twice the number of phases, such that $N_d = 2 \cdot q \cdot N_{ph}$, where q is a positive integer.

Since the power supply is three phase, $N_{ph}=3$ and consequently the second total number $N_d$ of the teeth is such that $N_d = 2 \cdot 3 \cdot q = 6 \cdot q$.

Furthermore, each winding is a single-layer concentric winding, which means that the integer closest to the ratio $$\frac{N_d}{2 \cdot N_p},$$

e.g. referred to as $$\text{round}\left(\frac{N_d}{2 \cdot N_p}\right)$$

is an odd number. Specifically, each winding surrounds one tooth situated between an even slot and an odd slot, where a slot is the space situated between two adjacent teeth.

Each electromechanical conversion member has fractional poles, which corresponds to a ratio $$\frac{N_d \cdot N_{ph}}{N_p}$$

that is not an integer, and thus $$\frac{N_d \cdot N_{ph}}{N_p} \notin \mathbb{N}.$$

Each electromechanical conversion member has periodicity of second order.

The periodicity of a machine serves to break down the machine into an elementary machine and enables its designer to study the elementary machine in simple manner, and then to apply the periodicity. For an electric machine, the magnetic and electrical circuit diagrams of the machine repeat with the periodicity, so the first total number $N_p$ for the pairs of magnetic poles of the rotor and the second total number $N_d$ for the teeth of the stator are linked by the order of this periodicity.

For an order of two, it is possible to study half of each electromechanical conversion member relative to an axis of symmetry. It is deduced therefrom that the greatest common divisor to the first number of poles and the second number of teeth is this order of periodicity, such that $$GCD\left(\frac{N_d}{2}, N_p\right) = 2.$$

It can be deduced that $N_d=4\cdot x$ and $N_p=2\cdot y$, where x and y are positive integers. These equations mean that it is possible to find two axes of symmetry for each electromechanical conversion member, which can thus be split into four elementary machines.

It is also assumed that the first total number $N_P$ for pairs of magnetic poles of the rotor is less than the second total number $N_d$ for teeth of the stator, and that the first total number $N_p$ for pairs of magnetic poles of the rotor is less than or equal to 20. These assumptions can then be expressed as follows: $N_p<N_d$ and $N_p\leq 20$ It is then assumed that $q=2\cdot z$ for z being a positive integer, which represents the fractional aspect of each electromechanical conversion member that stems from the number of teeth per pole and per phase $$\frac{N_d \cdot N_{ph}}{N_p}$$

not being an integer, so the following can be written $N_d=2.2.3\cdot z$, from which it can be deduced that:

$$\frac{N_d \cdot N_{ph}}{N_p} = \frac{2.2.3.3 \cdot z}{2 \cdot y} \notin N.$$

Also knowing that $N_d=4\cdot x=2.3\cdot q$, it is possible to write:

$$z = \frac{x}{3}.$$

From this it can be deduced that $y\notin\{1;2;3;6;9;18;z;2\cdot z; 3\cdot z;6\cdot z;9\cdot z;18\cdot z\}$, $N_p\notin\{2;4;6;12;18;2\cdot z;4\cdot z;6\cdot z;18\cdot z\}$ and $N_d \notin\{N_p;2\cdot N_p;3\cdot N_p;6\cdot N_p;9\cdot N_p\}$.

It can then be concluded that $N_p\in\{8;10;14;16;20\}$ and that $N_d$ is a multiple of 12, for a three-phase power supply.

Furthermore, it is known that the integer closest to the ratio $$\frac{N_d}{2\cdot N_p}$$

is an odd number.

Writing (2n−1) as being an odd number for any positive integer n, and the difference:

$$\frac{N_d}{2\cdot N_p} - (2\cdot n - 1)$$

then lies in a range extending from −½ to ½.

The following can then be written:

$$-\frac{1}{2} < \frac{N_d}{2\cdot N_p} - (2\cdot n - 1) < \frac{1}{2},$$

from which it can be concluded that $(4n-3)\cdot N_p<N_d<(4n-1)\cdot N_p$.

Consequently, the first total number $N_p$ for pairs of magnetic poles of the rotor must firstly belong to the range $\{8;10;14;16;20\}$ and simultaneously the second total number $N_d$ for the teeth of the stator can be obtained by solving the inequality $(4n-3)\cdot N_p<N_d<(4n-1)\cdot N_p$, where n is a positive integer and the second total number $N_d$ for the teeth is a multiple of 12.

There follows a summary table based on the assumptions made, where crosses correspond to pairs formed by the first total number $N_p$ for pairs of magnetic poles and the second total number $N_d$ for teeth that satisfy the above-mentioned conditions.

|    |    | Np | | | | |
|----|----|----|----|----|----|----|
|    |    | 8  | 10 | 14 | 16 | 20 |
| Nd | 12 | x  | x  | —  | —  | —  |
|    | 24 | —  | x  | x  | x  | x  |
|    | 36 | —  | —  | x  | x  | x  |
|    | 48 | —  | —  | —  | —  | x  |
|    | 60 | —  | —  | —  | —  | —  |
|    | 72 | —  | —  | x  | —  | —  |
|    | 84 | x  | —  | —  | —  | —  |
|    | 96 | —  | x  | x  | —  | —  |

In this application, it is the preferable to select the first total number $N_p$ for pairs of magnetic poles to be equal to 10 and the second total number $N_d$ for stator teeth to be equal to 24.

With a different assumption, each electromechanical conversion member has integrated poles with single-layer concentric winding, which then gives rise to a ratio $$\frac{N_d \cdot N_{ph}}{N_p}$$

that is equal to an integer, and thus $$\frac{N_d \cdot N_{ph}}{N_p} \in N.$$

It can then be deduced that $N_p\in\{2;4;6;8;10;12;14;16;18;20\}$. The following summary table then applies for pairs formed by a first total number $N_P$ for pairs of magnetic poles and a second total number $N_d$ for teeth.

|  | Np | | | | | | | | | |
|---|---|---|---|---|---|---|---|---|---|---|
|  | 2 | 4 | 6 | 8 | 10 | 12 | 14 | 16 | 18 | 20 |
| Nd  12 | x | — | x | — | — | — | — | — | — | — |
| 24 | — | x | — | — | — | x | — | — | x | — |
| 36 | x | — | x | — | — | — | — | — | x | — |
| 48 | — | — | — | x | — | — | — | — | x | — |
| 60 | x | — | x | — | x | — | — | — | — | — |
| 72 | — | x | — | — | — | x | — | — | — | — |
| 84 | x | — | x | — | — | — | x | — | — | — |
| 96 | — | — | — | — | — | — | — | x | x | — |

Furthermore, such an inequality can be determined for other embodiments of an electromechanical actuator of the invention by changing some of the assumptions.

For example, for a three-phase machine having two layers of integral or fractional poles, the following inequality is obtained:

$$\left(\frac{4}{3}n - 1\right) \cdot N_p < N_d < \left(\frac{4}{3}n - \frac{2}{6}\right) \cdot N_p$$

which must be satisfied by the pairs formed by the first total number $N_p$ for pairs of magnetic poles and the second total number $N_d$ for teeth.

In analogous manner, for a single-layer two-phase machine having integral or fractional poles, the inequality becomes:

$$(2n-3) \cdot N_p < N_d < (2n-1) \cdot N_p$$

The present invention also provides an electrical flight control device for an aircraft, e.g. a rotary wing aircraft, having an electromechanical actuator, a hydraulic actuator, and a mechanical transmission for each control axis of the aircraft.

Each electromechanical actuator serves to transform an electrical order coming from a flight control device of the aircraft into a mechanical order. This low power mechanical order is transmitted via a mechanical transmission to the hydraulic servo-control, where it is transformed into a high power mechanical order.

Each electromechanical actuator has at least three electromechanical conversion members and at least three control systems, each control system controlling the power supply and the operation of a respective electromechanical conversion member.

Each control system has all of the elements needed for powering and controlling one electromechanical conversion member.

By way of example, each control systems includes means for processing electrical control orders from the flight control device, an electronic power device, an electronic device for controlling and monitoring the electromechanical conversion member, sensors, and a stage for conditioning the power supply.

In order to reduce its overall size and weight, the mechanical transmission does not have any speed reduction member. The mechanical transmission may for example be a lightweight linkage comprising a connecting rod and a crank and serving to transmit movement from an electromechanical actuator to an input lever of a hydraulic actuator. The electromechanical actuator may thus be installed on a location that is segregated from the hydraulic actuator, e.g. in an environment that is not very aggressive for the electromechanical actuator, such as under a floor or in a cabin of the aircraft.

BRIEF DESCRIPTION OF THE DRAWINGS

The invention and its advantages appear in greater detail from the context of the following description of embodiments given by way of illustration and with Reference to the accompanying figures, in which.

Elements present in more than one of the figures are given the same references in each of them.

DETAILED DESCRIPTION OF THE INVENTION

Figure 1:
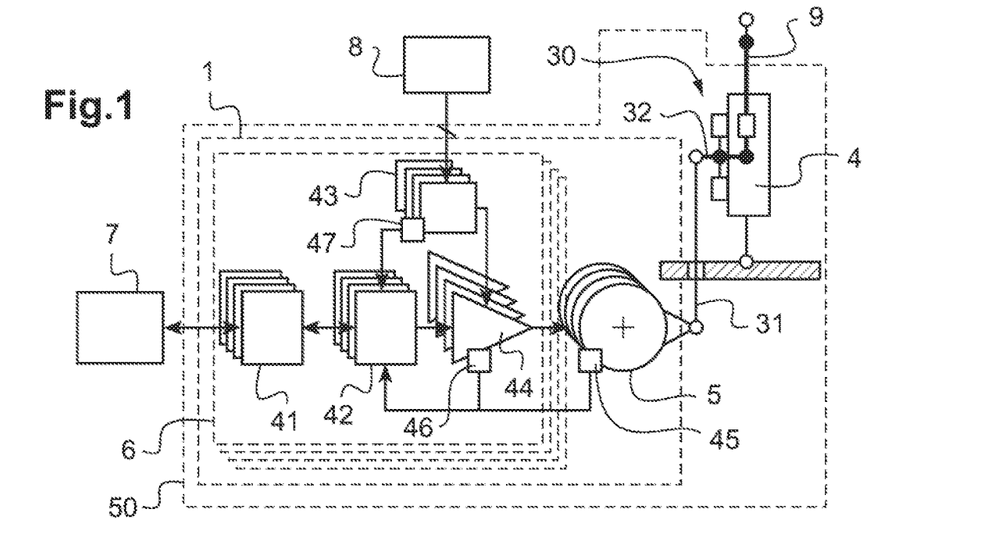
FIG. 1 shows an electrical flight control device for an aircraft.

FIG. 1 shows an electrical flight control device 50 for aircraft enabling each control axis of the aircraft to be controlled. Such an electric flight control device 50 is intended in particular for controlling variations in the collective and cyclic pitches of the blades of a main rotor of a rotary wing aircraft, and also variations in particular in the collective pitch of the blades of its anti-torque rotor.

The electrical flight control device 50 comprises an electromechanical actuator 1, a hydraulic actuator 4, and a mechanical transmission 30. The mechanical transmission 30 is a linkage comprising a connecting rod 31 and a crank 32 that serves to transmit movements of the electromechanical actuator 1 to an input lever of the hydraulic actuator 4, the input lever being secured to the crank 32.

Each electromechanical actuator 1 receives an electrical control order coming from a flight control device 7 of the aircraft and transforms it into a mechanical control order of low power that is transmitted via the mechanical transmission 30 to the hydraulic actuator 4. The hydraulic actuator 4 can then act via the movements of its rod 9 to deliver a mechanical control order of high power to a control axis of the aircraft.

Each electromechanical actuator 1 has four electromechanical conversion members 5 and four control systems 6, each control system 6 controlling the electrical power supply and the operation of a respective electromechanical conversion member 5. Thus, redundancy both in terms of the control system 6 and of the electromechanical conversion member 5 serves to mitigate any type of failure that might affect the electromechanical actuator 1, thereby guaranteeing reliable operation for the electromechanical actuator 1.

Each control system 6 has a processor device 41 for processing electrical control orders from the flight control device 7, an electronic control and monitoring device 42 for controlling and monitoring the electromechanical conversion member 5, an electronic power device 44, sensors 45, 46, and 47, and an electrical power supply conditioning stage 43. Furthermore, the electromechanical actuator 1 is connected to an electrical power supply device 8 that delivers DC. The electronic power device 44 serves to transform the DC into a three-phase AC voltage. Nevertheless, the electronic power device 44 could equally well be a purely resistive lowpass circuit, e.g. filtering out high frequencies, with the electrical power supply device 8 delivering a three-phase AC voltage directly.

Figure 2:
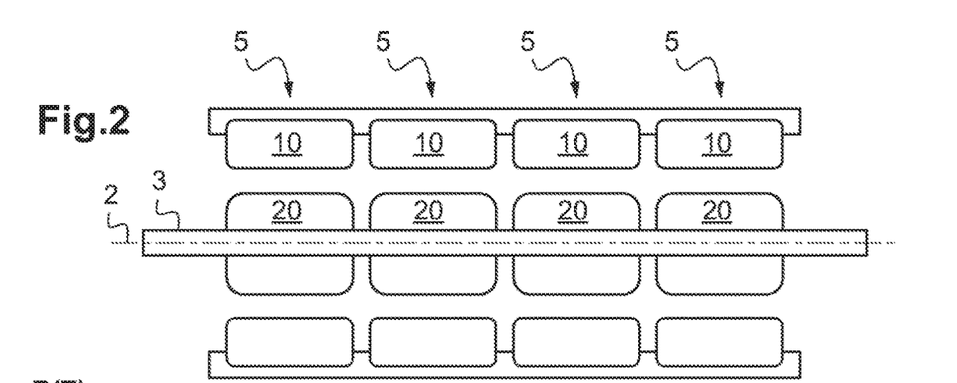
FIG. 2 shows a first embodiment of electromechanical conversion members of an electromechanical actuator of the invention.

FIG. 2 shows a first embodiment of the four electromechanical conversion members 5 of the electromechanical actuator 1. The electromechanical conversion members 5 share an axis of rotation 2 and a transmission shaft 3 in common. Furthermore, each electromechanical conversion member 5 has a stator 10 and a rotor 20, the rotor 20 rotating about the axis of rotation 2 inside the stator 10.

Figure 3:
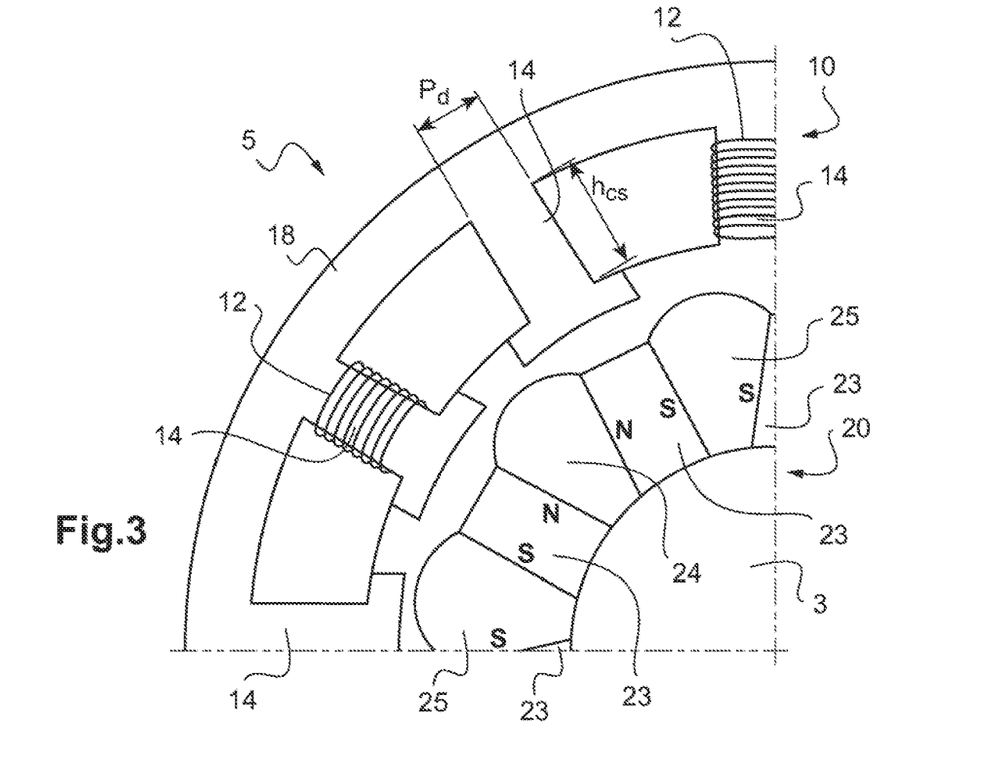
FIG. 3 is a fragmentary view of an electromechanical conversion member.

FIG. 3 is a fragmentary view of an electromechanical conversion member 5.

The rotor 20 secured to the transmission shaft 3 has permanent magnets 23 with north poles facing each other in pairs and south poles facing each other in pairs. This particular arrangement of the permanent magnets 23 characterizes a flux-concentrating rotor 20. A north magnetic pole 24 thus appears between two magnets 23 having their north poles facing each other. Likewise, a south magnetic pole 25 thus appears between two magnets 23 having their south poles facing each other.

The stator 10 has teeth 14, a stator yoke 18, and windings 12. Every other tooth 14 is surrounded by a winding 12, characteristic of a single-layer winding. Thus, each wound tooth 14 lies between two teeth without windings.

The teeth 14, the stator yoke 18, and the magnetic poles 24, 25 are made of ferromagnetic material, e.g. stacked laminations of iron-silicon alloy.

Furthermore, the magnetic poles 24, 25 of the rotor 20 project and are of substantially sinusoidal shape where they face the teeth 14 of the stator 10. The electromechanical conversion members 5 are thus sinusoidal magnetic flux members. The airgap of each electromechanical conversion member 5 is thus variable between a tooth 14 of a stator 10 and a magnetic pole 24, 25 of a rotor 20. By way of example, this airgap varies between a minimum value e equal to 1 mm, and a maximum value e', equal to 2 mm. This large airgap serves advantageously to guarantee reliable operation of the electromechanical actuator 1 by reducing, or even eliminating, any risk of any of the electromechanical conversion members 5 jamming as a result of a foreign body appearing in the airgap.

Furthermore, depending on the magnetic characteristics of the ferromagnetic material constituting the teeth 14, the teeth 14 of the stator 10 are of dimensions such that each electromechanical conversion member 5 operates close to its saturation limit.

Figure 6:
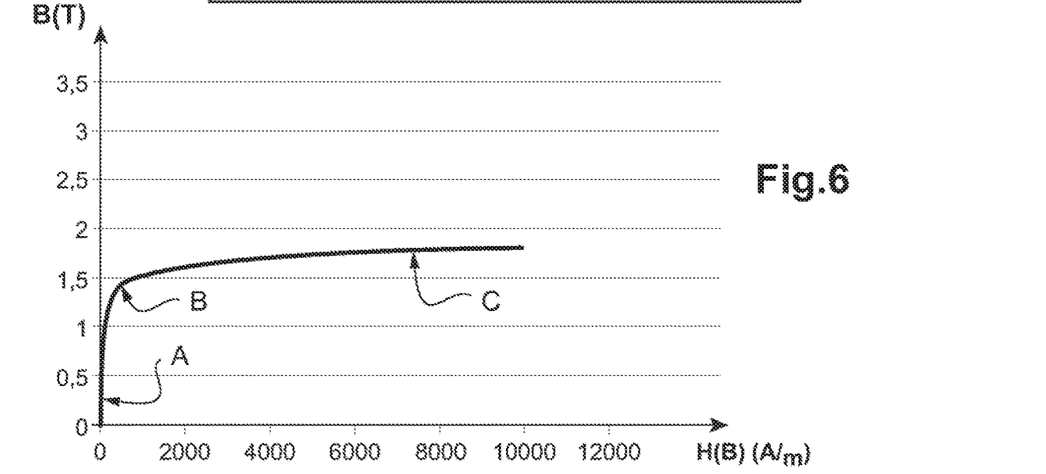
FIG. 6 plots curves showing variation in the magnetic induction in a ferromagnetic material as a function of its coercive magnetic field.

A curve plotting variation of the magnetic induction of a ferromagnetic material as a function of its coercive magnetic field is shown in FIG. 6. The magnetic induction of the ferromagnetic material, generally referenced "B" and expressed in teslas (T) is plotted up the ordinate axis while the coercive magnetic field, generally referenced "H(B)" is expressed in amps per meter (A/m), and is plotted along the abscissa axis.

This curve is specific for each material and has three distinct characteristics characterizing three different behaviors of the material.

A linear first portion A corresponds to the usual utilization zone for a ferromagnetic material in an electromechanical conversion member 5. This linear first portion A is a straight line of gradient equal to the magnetic permeability of the ferromagnetic material.

A bend second portion B corresponds to the beginning of the material saturating. This end second portion B constitutes a saturation bend of the ferromagnetic material.

A linear third portion C corresponds to a zone in which the ferromagnetic material is totally saturated. This linear third portion C is a straight line of gradient equal to the magnetic permeability of air. The slope of this linear third portion C is thus identical regardless of the ferromagnetic material. This linear third portion C does not constitute a nominal operating zone for an electromechanical conversion member. Nevertheless, after a failure of short-circuit type in an electromechanical conversion member, the material becomes magnetically saturated and the flux flowing through the material is determined by this linear third portion C.

Advantageously, each electromechanical conversion member 5 operates close to or at the saturation bend B of this curve plotting variation in magnetic induction, and there is only a small increase in the magnetic flux consequently in the torque of the electromechanical conversion member 5 in the event of a short-circuit type failure. As a result, from among the four electromechanical conversion members 5 of the electromechanical actuator 1, one electromechanical conversion member 5 is capable of compensating for the short-circuit torque that appears from an electromechanical conversion member 5 that has suffered a short-circuit type failure. Consequently, two other electromechanical conversion members 5 remain available for delivering the torque needed to operate the electromechanical actuator 1.

Furthermore, the short-circuit torque disappears as soon as the power supply to the electromechanical conversion member 5 that has suffered this failure is interrupted by the corresponding control system 6, once the failure has been detected.

The dimensions of the teeth 14 are thus defined so that depending the magnetic characteristics of the ferromagnetic material constituting the teeth 14, each electromechanical conversion member 5 operates close to the saturation bend B, or indeed in the saturation bend B. When the teeth 14 and the stator yoke 18 are made as a stack of laminations, the width $l_d$ of the teeth 14 and the height $h_{cs}$ of the stator yoke 18 are defined respectively by the following formulas:

$$l_d = \frac{B_g \cdot T_d}{B_{max} \cdot K_{fe}} \text{ and } h_{cs} = \frac{\Phi_g}{B_{max} \cdot L_{st} \cdot K_{st}};$$

where $T_d$ is the axial length of a tooth expressed in meters (m), $B_g$ is the airgap induction in nominal operation expressed in teslas (T), $K_{fe}$ is the swelling coefficient, $B_{max}$ is the maximum value of this induction expressed in teslas, $\Phi_g$ is the airgap flux at a rotor pole in nominal operation expressed in webers (Wb), $L_{st}$ is the axial length of the electromechanical conversion member expressed in meters, and $K_{st}$ is a staking factor.

Finally, the first total number $N_p$ of pairs of magnetic poles 24, 25 of the rotor 20 and the second total number $N_d$ of the teeth 14 of the stator 10 of an electromechanical conversion member 5 satisfy the following formula:

$$(4n-3) \cdot N_p < N_d < (4n-1) \cdot N_p$$

where n is a positive integer. This formula corresponds in particular to an electromechanical conversion member of the brushless motor type having permanent magnets with flux concentration and a single-layer winding with three-phase AC.

Figures 4, 5:
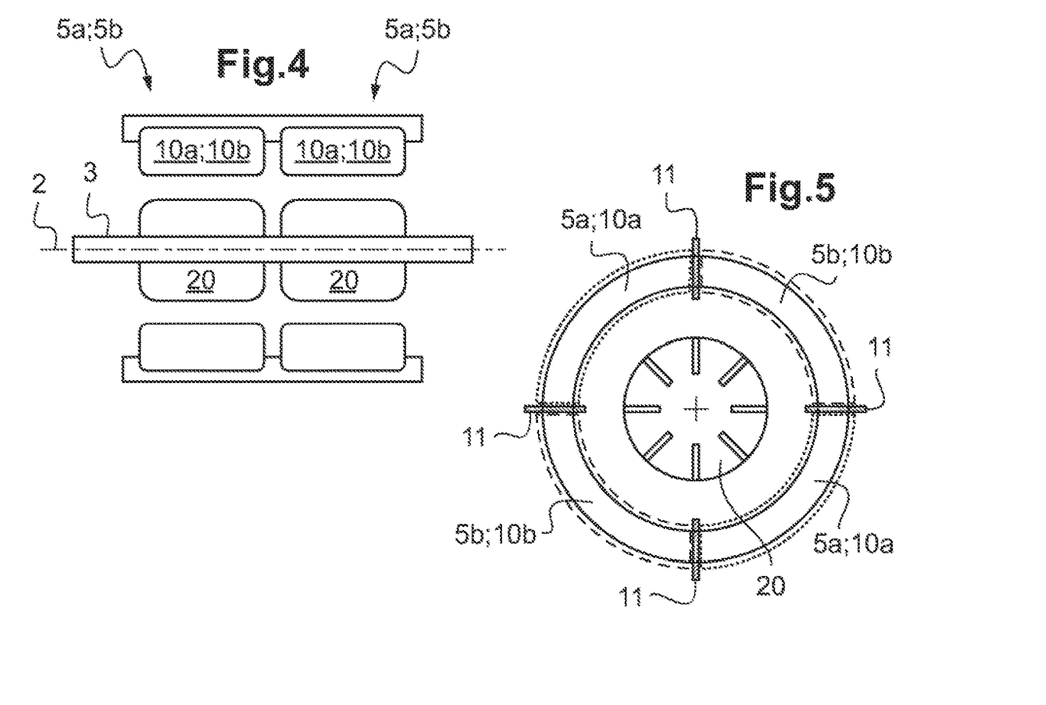
FIGS. 4 and 5 show a second embodiment of an electromechanical conversion member.

A second embodiment of four electromechanical conversion members 5 of the electromechanical actuator 1 is shown in FIGS. 4 and 5. The four electromechanical conversion members 5 are assembled in pairs and each pair of electromechanical conversion members 5a, 5b has a rotor 20 in common. Furthermore, in order to obtain balanced operation, each electromechanical conversion member 5a, 5b has a stator 10a, 10b in two portions, these two portions being diametrically opposite, as shown in FIG. 5.

The common rotor 20 thus co-operates simultaneously with both stators 10a, 10b included respectively in the two electromechanical conversion members 5a, 5b.

Furthermore, with each control system 6 powering an electromechanical conversion member 5 with three-phase AC, each pair of electromechanical conversion members 5a, 5b co-operates with the common rotor 20 to constitute a six-phase architecture made up by assembling two three-phase electromechanical conversion members 5a and 5b.

This six-phase architecture is designed for the purpose of maintaining magnetic equilibrium. It can then be controlled by a conventional three-phase system, such as for example by using pulse width modulation (PWM), which control may be operated by automatic control of stator currents in the Park plane.

In addition, non-magnetic radial separators 11 serve to provide magnetic isolation between the two stators 10a and 10b of this six-phase architecture. These non-magnetic radial separators 11 thus serve to avoid magnetic leaks appearing between the stators 10a and 10b, and also to avoid any other mutual magnetic disturbance.

Naturally, the present invention may be subjected to numerous variants as to its implementation. Although several embodiments are described, it will readily be understood that it is not conceivable to identify exhaustively all possible embodiments. It is naturally possible to envisage replacing any of the means described by equivalent means without going beyond the ambit of the present invention.

What is claimed is:

1. An electromechanical actuator for electrical flight controls of an aircraft, the electromechanical actuator comprising:
   a transmission shaft having an axis of rotation;
   at least three electromechanical conversion members, each respectively provided with a stator and a rotor secured to the transmission shaft and rotatable about the axis of rotation, the stator being provided with teeth and windings, each winding surrounding at least one tooth, the rotor being provided with permanent magnets each having a north magnetic pole and a south magnetic pole; and
   at least three control systems, each control system powering and controlling a respective electromechanical conversion member with one of the control systems being connected to a single electromechanical conversion member and powering the single electromechanical conversion member with AC;
   wherein the teeth are dimensioned so that each electromechanical conversion member operates at a saturation bend in a curve plotting variation of a magnetic induction of a ferromagnetic material constituting the teeth, thus enabling at least two of the electromechanical conversion members to mitigate a short-circuit type failure of another electromechanical conversion member, with one of the two electromechanical conversion members compensating a majority of the short-circuit torque coming from a failed electromechanical conversion member, while the other of the two electromechanical conversion members delivers the nominal torque needed to operate the electromechanical actuator and wherein, when each stator is provided with a stator yoke and each stator yoke is made up of a stack of laminations, the width $l_d$ of the teeth and the height $h_{cs}$ of the stator yoke are defined by the following formulas:

$$l_d = \frac{B_g \cdot T_d}{B_{max} \cdot K_{fe}} \text{ and } h_{cs} = \frac{\Phi_g}{B_{max} \cdot L_{st} \cdot K_{st}}$$

where $T_d$ is the axial length of a tooth, $B_g$ is the airgap induction in nominal operation, $K_{fe}$ is a swelling coefficient, $B_{max}$ is a maximum value of the induction, $\Phi_g$ is an airgap flux at a pole in nominal operation, $L_{st}$ is an axial length of an electromechanical conversion member, and $K_{st}$ is a stacking factor.

2. The electromechanical actuator according to claim 1, wherein each winding is a single-layer winding, the teeth adjacent to a tooth surrounded by the winding not being surrounded by a respective winding.

3. The electromechanical actuator according to claim 1, wherein each electromechanical conversion member is a magnetic flux-concentrating member.

4. The electromechanical actuator according to claim 1, wherein each control system powers an electromechanical conversion member with polyphase AC, and each winding is concentric, each tooth being surrounded by the winding in which there flows a single phase of the polyphase AC.

5. The electromechanical actuator according to claim 1, wherein at least two electromechanical conversion members have a rotor in common, the common rotor co-operating with the stators of the at least two electromechanical conversion members.

6. The electromechanical actuator according to claim 1, wherein the magnetic poles are of sinusoidal shape so that a sinusoidal magnetic flux flows in each electromechanical conversion member.

7. The electromechanical actuator according to claim 1, wherein a first total number $N_p$ of pairs of magnetic poles and a second total number $N_d$ of the teeth are such that:

(4n−3)·$N_p$ < $N_d$ < (4n−1)·$N_p$ where n is a positive integer.

8. The electromechanical actuator according to claim 1, wherein each control system powers one of the electromechanical conversion members with three-phase AC, and two electromechanical conversion members have a rotor in common, the common rotor co-operating with stators of the electromechanical conversion members the stators of the two electromechanical conversion members being assembled so as to co-operate with the common rotor to constitute a six-phase architecture.

9. The electromechanical actuator according to claim 8, wherein the stators co-operating with the common rotor are magnetically isolated from each other by non-magnetic radial separation.

10. The electromechanical actuator according to claim 1, wherein each stator is separated from the rotor by an airgap greater than 1 mm.

11. The electromechanical actuator according to claim 10, wherein the airgap lies in a range from 1 mm to 2 mm.

12. An electrical flight control device comprising:
   at least one electromechanical actuator;
   at least one hydraulic actuator; and at least one mechanical transmission, each mechanical transmission enabling the electromechanical actuator to control a hydraulic actuator;

wherein each electromechanical actuator is an actuator according to claim 1.

13. The electrical flight control device according to claim 12, wherein each mechanical transmission does not have a speed reduction member.

14. The electrical flight control device according to claim 12, wherein each mechanical transmission system is a linkage comprising a connecting rod and a crank.

15. An electromechanical actuator for electrical flight controls of an aircraft, the electromechanical actuator comprising:

a transmission shaft having an axis of rotation;

at least three electromechanical conversion members, each respectively provided with a stator and a rotor secured to the transmission shaft and rotatable about the axis of rotation, the stator being provided with teeth and windings, each winding surrounding at least one tooth, the rotor being provided with permanent magnets each having a north magnetic pole and a south magnetic pole;

at least three control systems, each control system powering and controlling a respective electromechanical conversion member with one of the control systems being connected to a single electromechanical conversion member and powering the single electromechanical conversion member with AC;

wherein the teeth are dimensioned so that each electromechanical conversion member operates at the saturation bend in a curve plotting variation of a magnetic induction of a ferromagnetic material constituting the teeth, thus enabling at least two of the electromechanical conversion members to mitigate a short-circuit type failure of another electromechanical conversion member, with one of the two electromechanical conversion members compensating the majority of the short-circuit torque coming from a failed electromechanical conversion member, while the other of the two electromechanical conversion members delivers the nominal torque needed to operate the electromechanical actuator; and wherein, when each stator is provided with a stator yoke and each stator yoke is made up of a stack of laminations, the width $l_d$ of the teeth and the height $h_{cs}$ of the stator yoke are defined by the following formulas:

$$l_d = \frac{B_g \cdot T_d}{B_{max} \cdot K_{fe}} \text{ and } h_{cs} = \frac{\Phi_g}{B_{max} \cdot L_{st} \cdot K_{st}}$$

where $T_d$ is the axial length of a tooth, $B_g$ is the airgap induction in nominal operation, $K_{fe}$ is a swelling coefficient, $B_{max}$ is a maximum value of the induction, $\Phi_g$ is an airgap flux at a pole in nominal operation, $L_{st}$ is an axial length of an electromechanical conversion member, and $K_{st}$ is a stacking factor.

16. The electromechanical actuator according to claim 15, wherein each electromechanical conversion member is a magnetic flux-concentrating member.

17. The electromechanical actuator according to claim 15, wherein each control system powers an electromechanical conversion member with polyphase AC, and each winding is concentric, each tooth being surrounded by the winding in which there flows a single phase of the polyphase AC.

18. The electromechanical actuator according to claim 15, wherein each control system powers one of the electromechanical conversion members with three-phase AC, and two electromechanical conversion members have a rotor in common, the common rotor co-operating with stators of the electromechanical conversion members the stators of the two electromechanical conversion members being assembled so as to co-operate with the common rotor to constitute a six-phase architecture.

19. The electromechanical actuator according to claim 15, wherein a first total number $N_p$ of pairs of magnetic poles and a second total number $N_d$ of the teeth are such that:

$(4n-3) \cdot N_p < N_d < (4n-1) \cdot N_p$ where n is a positive integer.

* * * * *

UNITED STATES PATENT AND TRADEMARK OFFICE
CERTIFICATE OF CORRECTION

| | | |
|---|---|---|
| PATENT NO. | : 10,931,163 B2 | Page 1 of 1 |
| APPLICATION NO. | : 15/767753 | |
| DATED | : February 23, 2021 | |
| INVENTOR(S) | : Pierre Estival et al. | |

It is certified that error appears in the above-identified patent and that said Letters Patent is hereby corrected as shown below:

On the Page 2, under the heading "FOREIGN PATENT DOCUMENTS":
Before:
"EP 2543589 A1 1/2013";
Add:
-- DE 102013112525 A1 5/2015
EP 2378634 A1 10/2011 --.

Signed and Sealed this
Twentieth Day of April, 2021

Drew Hirshfeld
*Performing the Functions and Duties of the*
*Under Secretary of Commerce for Intellectual Property and*
*Director of the United States Patent and Trademark Office*